W. F. HAMILTON.
SHOE FOR THRESHING MACHINE TEETH.
APPLICATION FILED SEPT. 3, 1919.
1,341,230. Patented May 25, 1920.
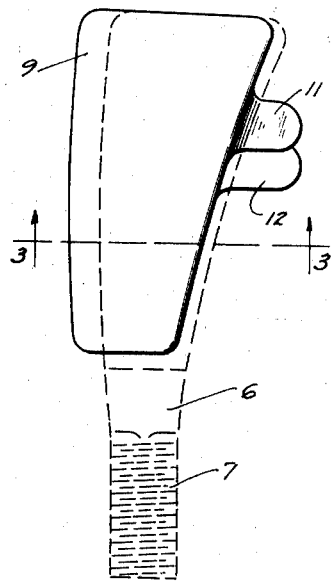
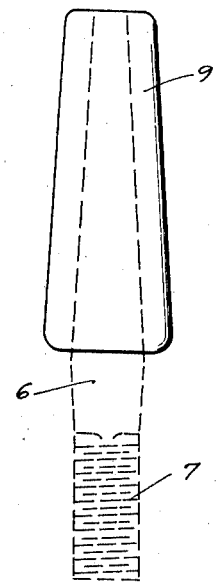
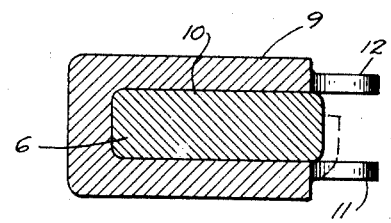
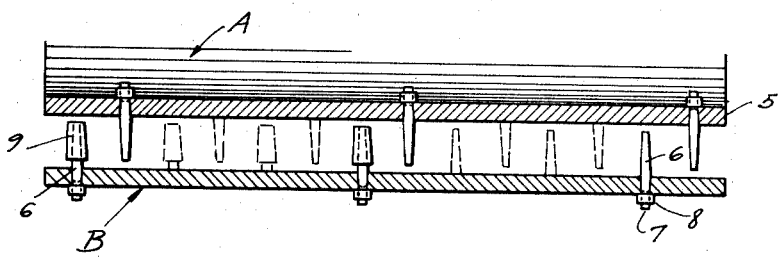
Inventor
William Francis Hamilton
by Nestall and Wallace
his Attorneys

UNITED STATES PATENT OFFICE.

WILLIAM FRANCIS HAMILTON, OF VENTURA, CALIFORNIA.

SHOE FOR THRESHING-MACHINE TEETH.

1,341,230. Specification of Letters Patent. Patented May 25, 1920.

Application filed September 3, 1919. Serial No. 321,335.

*To all whom it may concern:*

Be it known that I, WILLIAM FRANCIS HAMILTON, a citizen of the United States, residing at Ventura, in the county of Ventura and State of California, have invented new and useful Improvements in Shoes for Threshing-Machine Teeth, of which the following is a specification.

Threshing machines having a rotatable roller or cylinder with spaced teeth or spikes thereon, and a concave with spaced stationary teeth are commonly employed to thresh cereals, beans, peas, and other agricultural products. The teeth on the cylinder pass between the teeth on the concave, and the amount of clearance for efficient threshing is dependent upon the nature of the product treated. Thus, for Lima beans, the clearance should be greater than for white navy beans. In certain agricultural sections the variety of products which are threshed is comparatively large, and threshing machines to handle the various products are equipped with cylinders and corresponding concaves having teeth with appropriate clearances. Upon a change in the product to be threshed, cylinders and concaves must be changed. Such equipment is expensive, means must be provided for its transport, and labor and time required for the changes.

It is an object of my invention to provide shoes to envelop the teeth so as to decrease the clearance between the cylinder and concave teeth.

It is another object of this invention to provide shoes of the character described, which may be quickly applied to the teeth and which will not require disassembling of the threshing machines.

These objects will be more fully understood, as will also other objects and corresponding accomplishments of my invention from the following detailed description of a preferred embodiment thereof. For the purpose of this description reference is had to the accompanying drawing, in which:

Figure 1 is a side elevation of a shoe, it being in position upon a tooth shown in dotted lines; Fig. 2 is a front elevation of the shoe shown in Fig. 1; Fig. 3 is a section taken on the line 3—3 of Fig. 1 with a tooth shown in full line; and Fig. 4 is a section through a threshing machine cylinder and concave showing some of the teeth with shoes applied thereto.

Referring more particulary to Fig. 4, A indicates a threshing machine cylinder, and B the concave. The teeth on the cylinder pass between the teeth on the concave. A well known type of cylinder is built up with slats extending longitudinally on its surface, one being indicated by 5. Teeth are mounted on the slats and are of the same general shape as the teeth on the concave. It is common to stagger the teeth in each successive three rows and in Fig. 4 the teeth in one row are shown in full lines and in the following two rows are shown conventionally in dotted lines.

Referring particularly to Figs. 1, 2, and 3, a concave tooth is indicated by 6 and is provided with a threaded shank 7, so that it may be secured to the concave by means of a nut 8 as shown in Fig. 4. The sides of the teeth converge from bottom to top, and the rear of a tooth commonly diverges from bottom to top. However, my invention is not limited to any particular type of tooth, and the one shown is merely for illustrative purposes.

The shoe 9 is a cast iron body conforming on its exterior to the shape of the teeth and having a channel 10 extending from top to bottom. The channel 10 is of such size that the tooth will snugly fit therein. Ears 11 and 12 are provided upon the rear of the shoe in such position that they may be bent over the tooth, the dotted lines in Fig. 3 indicating ear 11 so bent, thus, assisting in holding the shoe in place. It will be noted that when the shoe is applied to a tooth, the width of the latter is expanded and the clearance between cylinder teeth and concave teeth decreased. This is best shown in Fig. 4.

If it is desired to thresh products requiring a less clearance, the shoes are placed upon the concave teeth and forced to a tight fit so that friction will tend to hold the shoes in position. As the products are forced against the closed side of the shoe there is little tendency for shoes to be displaced. I prefer to place the shoes upon the concave teeth as the latter are stationary and there is no tendency to throw the shoe from the teeth as would be the case with the cylinder. It is obvious that shoes of various sizes may be placed upon the teeth to adapt the machine to various products.

What I claim is:

1. In a threshing mechanism, the combination with a threshing tooth having a forward operating face and corresponding side faces, of an enlarging filler shoe having an inner recess conformable to the forward and side faces of said teeth and having an outer forward face substantially parallel to the operating face of said tooth and outer side faces substantially parallel with the side faces of said tooth.

2. In a threshing mechanism, a threshing tooth having a forward substantially flat operating surface, and substantially parallel side surfaces, and an enlarging filler shoe having an inner recess conformable to the forward and side surfaces of said tooth and having an outer forward operating surface substantially parallel to the operating surface of said tooth, and outer side surfaces substantially parallel with the side surfaces of said tooth.

In witness that I claim the foregoing I have hereunto subscribed my name this 21st day of August, 1919.

WILLIAM FRANCIS HAMILTON.